United States Patent [19]
Bradley et al.

[11] Patent Number: 5,430,847
[45] Date of Patent: Jul. 4, 1995

[54] METHOD AND SYSTEM FOR EXTENDING SYSTEM BUSES TO EXTERNAL DEVICES

[75] Inventors: Joseph L. Bradley; Brad W. Michael, both of Kingston; Mark E. VanNostrand, Staatsburg; Susan D. Wright, Salt Point, all of N.Y.

[73] Assignee: International Business Machines Corporation, Armonk, N.Y.

[21] Appl. No.: 964,798

[22] Filed: Oct. 22, 1992

[51] Int. Cl.⁶ .............................................. G06F 13/00
[52] U.S. Cl. ..................................... 395/325; 395/275
[58] Field of Search ..................... 395/325, 250, 275

[56] References Cited

U.S. PATENT DOCUMENTS

| | | | |
|---|---|---|---|
| 4,514,823 | 4/1985 | Mendelson et al. | 395/275 |
| 4,571,671 | 2/1986 | Burns et al. | 395/250 |
| 4,635,192 | 1/1987 | Ceccon et al. | 395/325 |
| 4,683,550 | 7/1987 | Jindrick et al. | 364/709.1 |
| 4,779,196 | 10/1988 | Manga | 395/325 |
| 4,866,609 | 9/1989 | Calta et al. | 395/250 |
| 4,967,344 | 10/1990 | Scavezze et al. | 395/575 |
| 4,972,368 | 11/1990 | O'Brien et al. | 395/275 |
| 4,984,195 | 1/1991 | Nakamura et al. | 395/325 |
| 5,029,124 | 7/1991 | Leahy et al. | 395/325 |
| 5,043,877 | 8/1991 | Berger et al. | 395/325 |
| 5,053,947 | 10/1991 | Heibel et al. | 395/325 |
| 5,159,684 | 10/1992 | Kroll et al. | 395/500 |
| 5,245,703 | 9/1993 | Hubert | 395/200 |

*Primary Examiner*—Jack B. Harvey
*Assistant Examiner*—Glenn A. Auve
*Attorney, Agent, or Firm*—William A. Kinnaman; Duke W. Yee; Andrew J. Dillon

[57] ABSTRACT

A method and system for rapid transfer of data between a system bus and an external device coupled together by a cable. A data processing system having at least one computer system, which includes an internal bus and an external device is provided wherein the internal bus is coupled to the external device via a cable. The external device includes an external processor capable of accessing data within the computer system. The data processing system also includes an interface module having a number of buffers for storing data, wherein the interface module is interposed along the cable between the computer and the external device. Control circuitry is included in the interface module for reading from and placing data into the buffers. Transmission circuitry within the interface module is utilized for timing and controlling transmission of data from the buffers to the internal bus and the external processor in a manner that emulates direct transfer of data between the internal bus and a processor coupled directly to the internal bus.

1 Claim, 13 Drawing Sheets

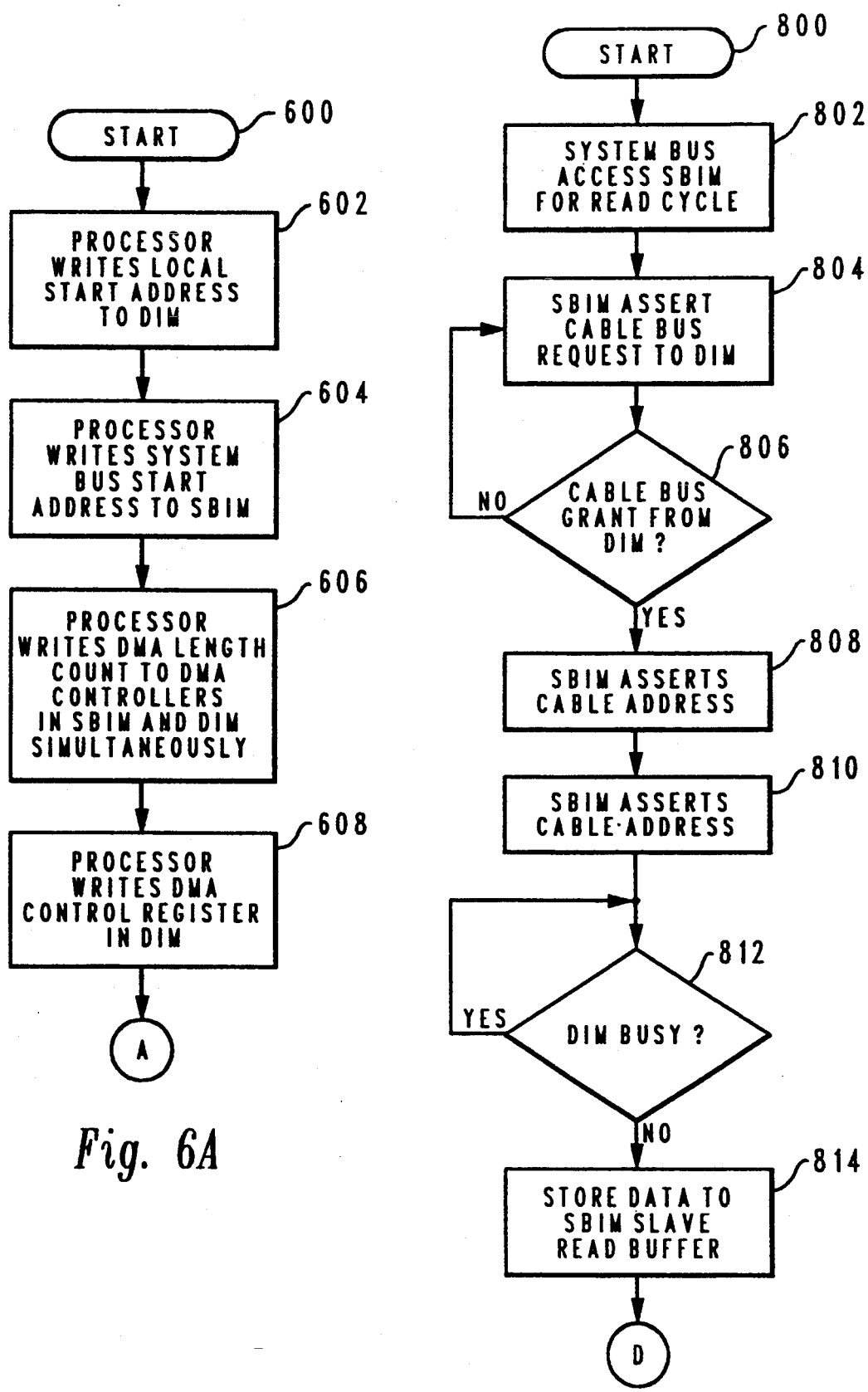

METHOD AND SYSTEM FOR EXTENDING SYSTEM BUSES TO EXTERNAL DEVICES

BACKGROUND OF THE INVENTION

1. Technical Field

The present invention relates in general to a method and system for providing communication between a bus and a peripheral device and in particular to a method and system for providing asynchronous communication between a system bus and a peripheral device, wherein the peripheral device is externally connected by a cable to the system bus. Still more particularly, the present invention relates to a method and system for providing bus master and slave capabilities between a system bus and an externally located peripheral device.

2. Description of the Related Art

Generally in computer systems and especially in personal computer systems and in work stations, data is transferred between various elements such as a central processing unit, input/output adapters, input/output devices, bus controllers (i.e., elements that can control the computer system such as bus masters or direct memory access ("DMA") controllers and slaves), bus slaves (i.e., elements that are controlled by bus controllers) as well as memory devices, such as system memory. These elements are often interconnected via a system or data bus, which is part of a system architecture. Various devices such as graphics adapters may be connected to the system or data bus. Generally, such adapters are directly connected to the bus.

Advanced graphics adapters require an extremely high data transfer rate, but cannot depend on large amounts of data to absorb the start-up cost for each transfer. As a result, an interface to a system bus must be able to start a cycle with minimum latency and transfer data to the graphics adapter utilizing the fastest transfer mechanism available. Additionally, another consideration in designing advanced graphics adapters is the space and power required to allow maximized function and performance. Presently, many advanced graphics adapters are enclosed in a separate box external to a personal computer or work station. Such external graphics adapters require bus master and slave capabilities such as those found on the Micro Channel system bus by International Business Machines Corporation. Micro Channel is a registered trademark of International Business Machines Corporation.

It would therefore be desirable to provide a method and system for providing bus master and slave capabilities via an asynchronous interface between a system bus and an external peripheral device coupled together by a cable.

SUMMARY OF THE INVENTION

It is therefore one object of the present invention to provide an improved method and system for providing communication between a bus and a peripheral device.

It is another object of the present invention to provide an asynchronous communication link between a system bus and a peripheral device, wherein the peripheral device is externally connected by a cable to the system bus.

It is yet another object of the present invention to provide bus master and slave capabilities between a system bus and an externally located peripheral device connected to the system bus by a cable.

The foregoing objects are achieved as is now described. The present invention provides a method and system for rapid transfer of data between a system bus and an external device coupled together by a cable. A data processing system having at least one computer system, which includes an internal bus and an external device, is provided wherein the internal bus is coupled to the external device via a cable. The external device includes an external processor capable of accessing data within the computer system. The data processing system also includes an interface module having a number of buffers for storing data, wherein the interface module is interposed along the cable between the computer and the external device. Control circuitry is included in the interface module for reading data from the buffers and placing data into the buffers. Transmission circuitry within the interface module is utilized for timing and controlling transmission of data from the buffers to the internal bus and the external processor in a manner that emulates direct transfer of data between the internal bus and a processor coupled directly to the internal bus.

The interface module described herein includes two submodules, an internal or system bus interface module and a processor interface module. The system bus interface module is located within the data processing system and the processor interface module is located within the peripheral device. The two submodules are coupled together by the cable. Transfer of data between the system bus and the external processor is accomplished by providing cable signals and protocols for transfer of data between the two submodules that allows the external processor to perform slave and bus-master functions without alterations to external processor or the system bus.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 6A is a portion of a logical flowchart for a method and system of DMA transfer in accordance with a preferred embodiment of the present invention;

FIG. 8A is a portion of a logical flowchart for a method and system for performing a slave read in accordance with a preferred embodiment of the present invention;

DETAILED DESCRIPTION OF PREFERRED EMBODIMENT

Figure 1:
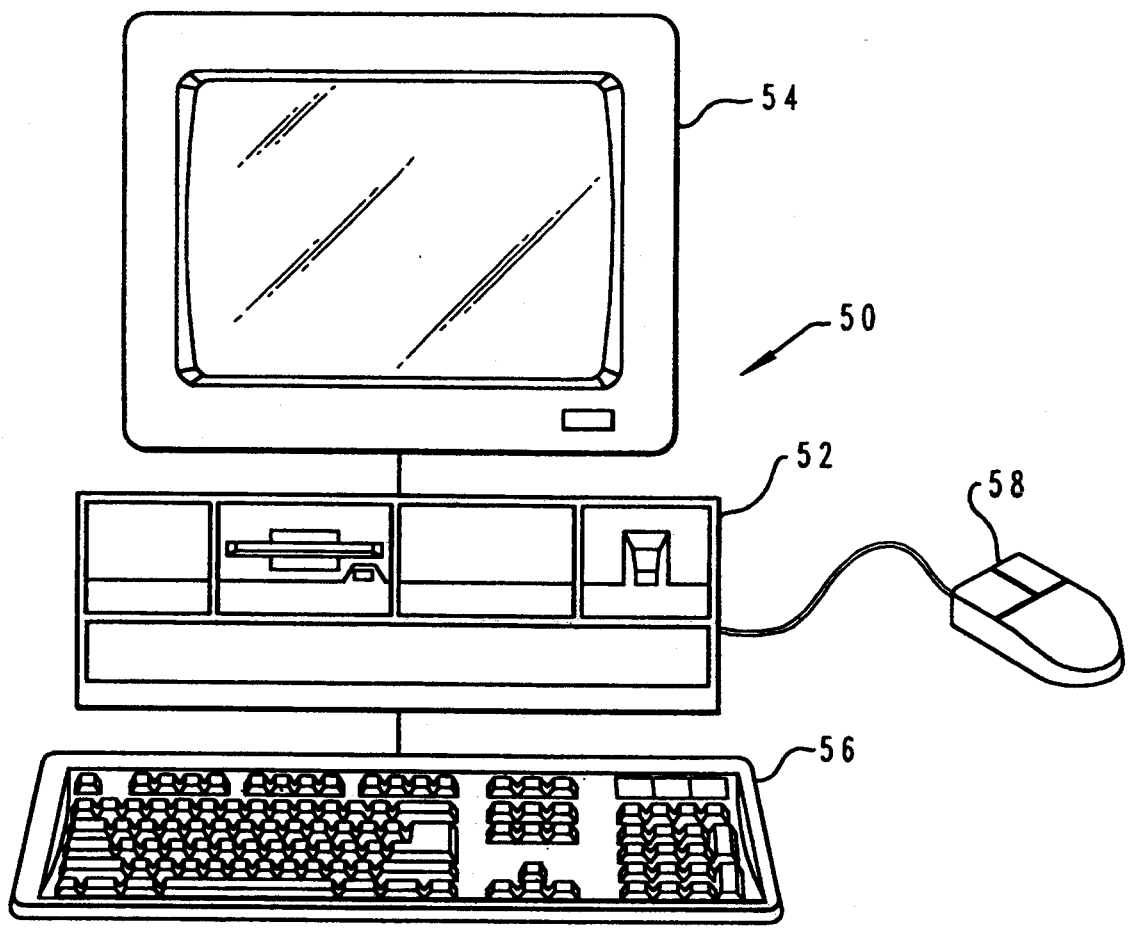
FIG. 1 depicts a pictorial representation of a computer system in which the present invention may be implemented in accordance with a preferred embodiment of the present invention.

With reference now to the figures and in particular with reference to FIG. 1, there is depicted a pictorial representation of a computer system in which the present invention may be implemented in accordance with a preferred embodiment of the present invention. A computer 50 is depicted which includes a system unit 52, a video display terminal 54, a keyboard 56, and a mouse 58. Computer 50 may be implemented utilizing any suitable computer such as the IBM PS/2 computer or an IBM RISC System/6000 computer, both products of International Business Machines Corporation. RISC System/6000 and PS/2 are registered trademarks of International Business Machines Corporation. Although the depicted embodiment involves a personal computer or a work station, a preferred embodiment of the present invention may be implemented in other types of data processing systems, such as for example, intelligent work stations or mini-computers.

Figure 2:
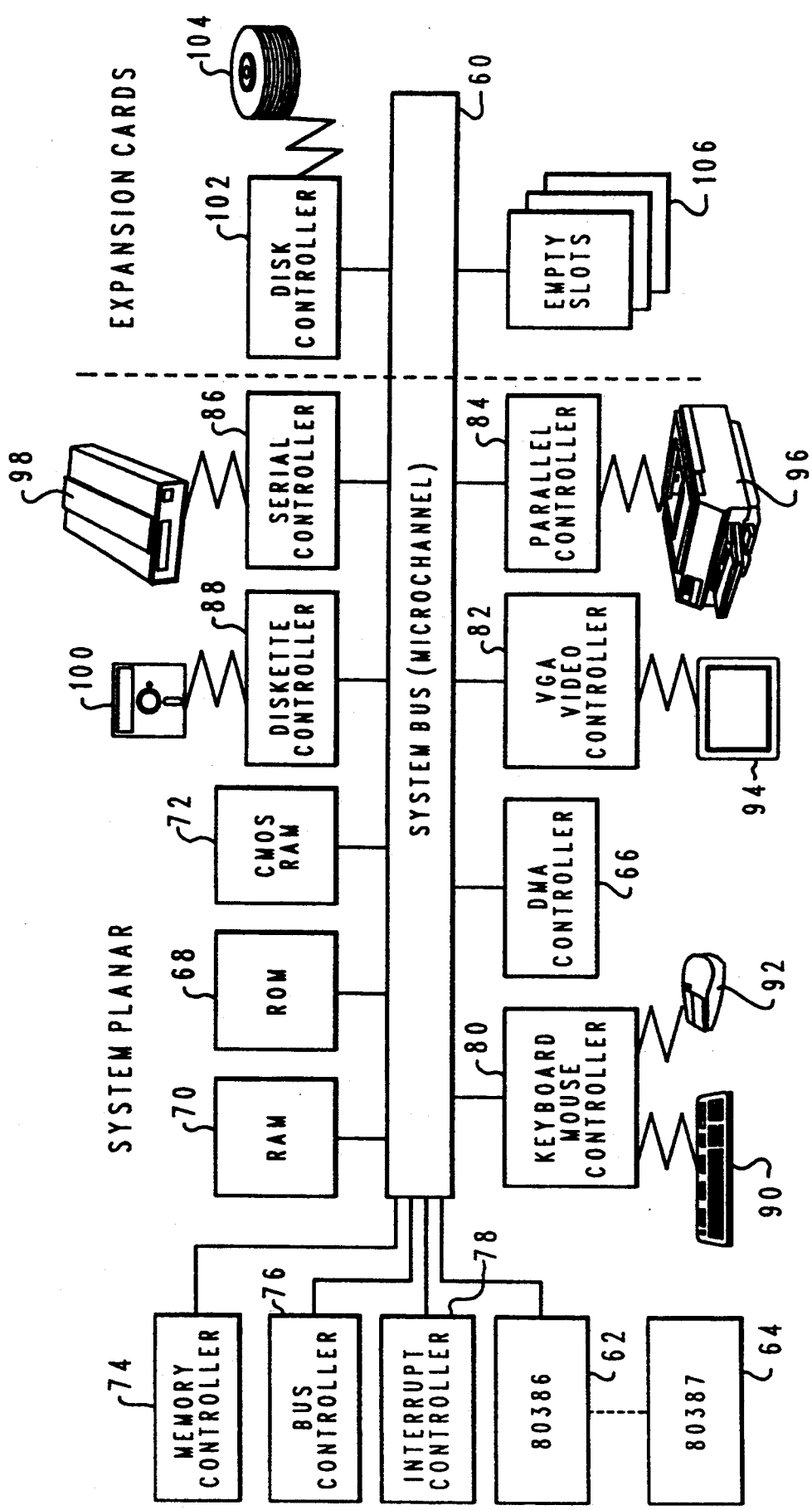
FIG. 2 is a block diagram of selected components in the computer system of FIG. 1 in which a preferred embodiment of the present invention may be implemented.

Referring now to FIG. 2, there is depicted a block diagram of selected components in computer 50 in which a preferred embodiment of the present invention may be implemented. System unit 52 preferably includes a system bus 60 for interconnecting and establishing communication between various components in system unit 52. Microprocessor 62 is connected to system bus 60 and also may have numeric coprocessor 64 connected to it. DMA controller 66 also is connected to system bus 60 and allows various devices to appropriate cycles from microprocessor 62 during large I/O transfers.

Read only memory ("ROM") 68 is mapped into the microprocessor 62 address space in the range from 640K to 1 megabyte. Read Only Memory ("ROM") 68 and Random Access Memory ("RAM") 70 are also connected to system bus 60. ROM 68 contains the power-on self test ("POST") and the Basic Input/Output System ("BIOS") which control hardware operations, such as those involving disk drives and the keyboard. CMOS RAM 72 is attached to system bus 60 and contains system configuration information.

Also connected to system bus 60 are memory controller 74, bus controller 76, and interrupt controller 78 which serve to aid in the control of data flow through system bus 60 between various peripherals, adapters, and devices. System unit 52 also contains various input-/output ("I/O") controllers such as: keyboard and mouse controller 80, video controller 82, parallel controller 84, serial controller 86, and diskette controller 88. Keyboard and mouse controller 80 provide a hardware interface for keyboard 90 and mouse 92. Video controller 82 provides a hardware interface for video display terminal 94. Parallel controller 84 provides a hardware interface for devices such as printer 96. Serial controller 86 provides a hardware interface for devices such as a modem 98. Diskette controller 88 provides a hardware interface for floppy disk unit 100. Expansion cards may also be added to system bus 60, such as disk controller 102, which provides a hardware interface for hard disk unit 104. Empty slots 106 are provided so that other peripherals, adapters, and devices may be added to system unit 52.

Those skilled in the art will appreciate that the hardware depicted in FIG. 2 may vary for specific applications. For example, other peripheral devices such as: optical disk media, audio adapters, or chip programming devices such as a PAL or EPROM programming device, and the like also may be utilized in addition to or in place of the hardware already depicted.

Figure 3:
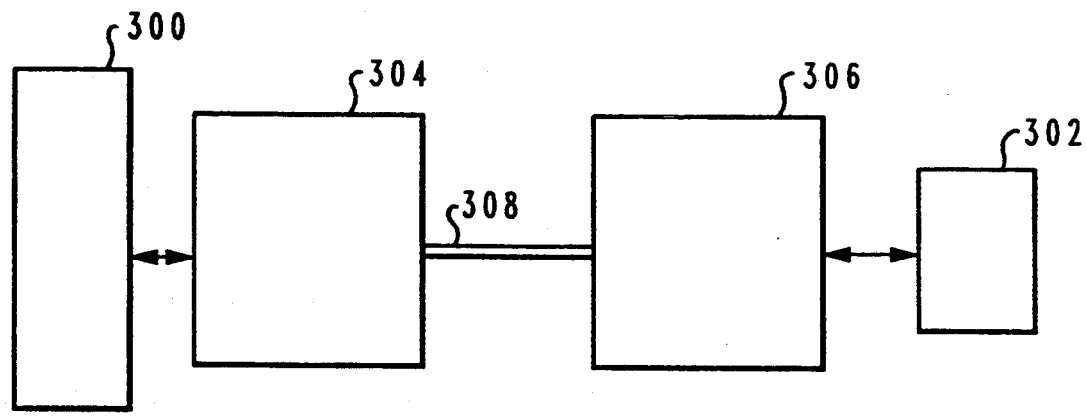
FIG. 3 depicts a diagram of a two module interface system in accordance with a preferred embodiment of the present invention.

Referring now to FIG. 3, there is depicted a diagram of a two module bus interface system in accordance with a preferred embodiment of the present invention. This two chip bus interface system may be utilized in the computer system as depicted in FIGS. 1 and 2. Communication between system bus 300 and peripheral device 302 may be accomplished by utilizing system bus interface module ("SBIM") 304 and device interface module ("DIM") 306. A more detailed description of these two modules may be found below. SBIM 304 is coupled to system bus 300 and handles the transfer of data between system bus 300 and DIM 306. SBIM 304 may be coupled to system bus 300 via an adapter card placed into one on empty slots 106. DIM 306 handles the transfer of data between peripheral device 302 and SBIM 304. Cable 308 is employed to connect SBIM 304 and DIM 306.

Figure 4:
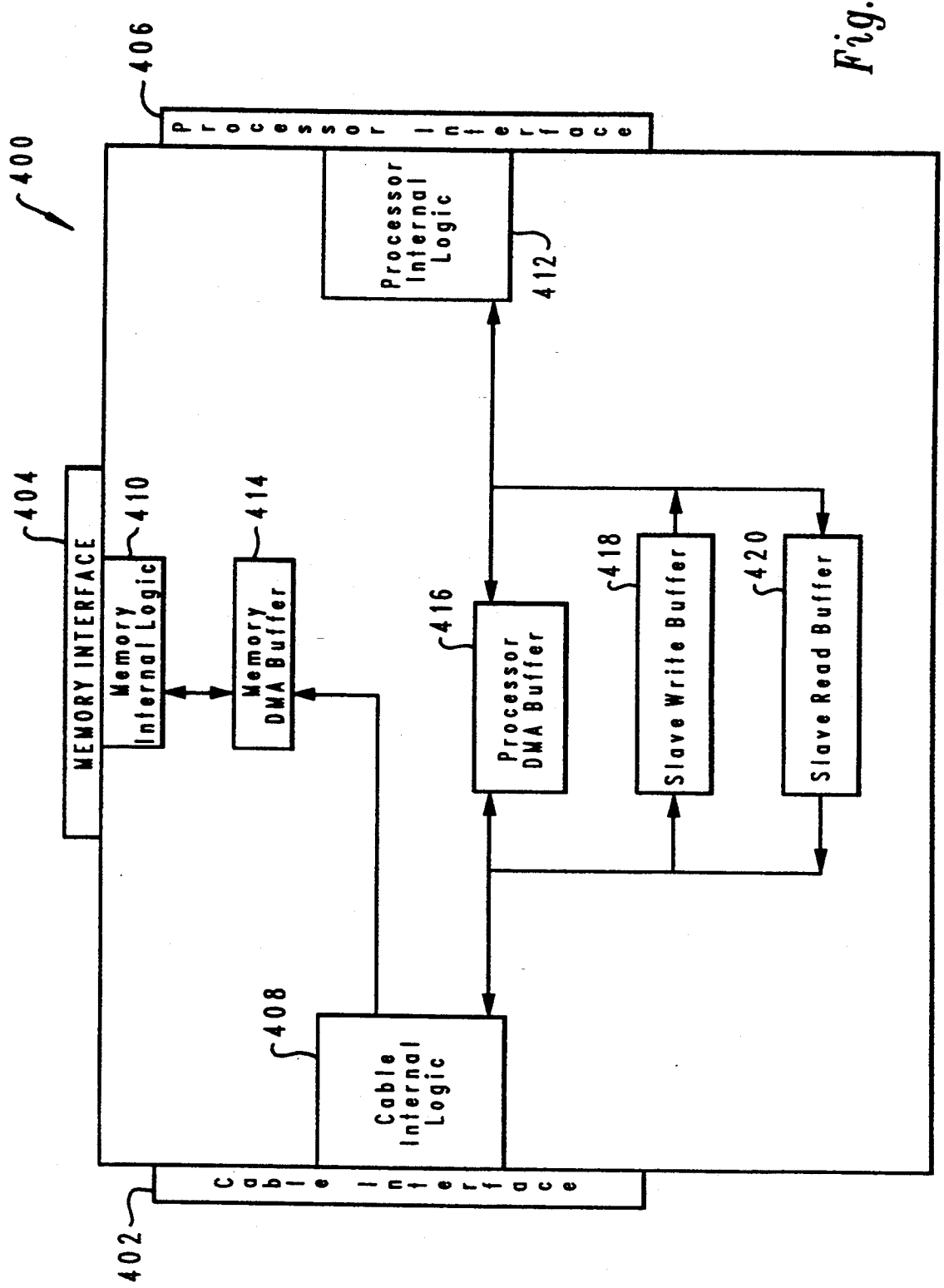
FIG. 4 is a block diagram of a device interface module (DIM) in accordance with a preferred embodiment of the present invention.

With reference now to FIG. 4, there is depicted a block diagram of a device interface module in accordance with a preferred embodiment of the present invention. DIM 400 is a three ported chip including cable interface 402, memory interface 404 and processor interface 406 in accordance with a preferred embodiment of the present invention. Communication between the cable and DIM 400 is handled by cable internal logic 408 while data transfer through memory interface 404 is controlled by memory internal logic 410. Data transfer through processor interface 406 is controlled by processor internal logic 412. Memory DMA buffer 414 and processor DMA buffer 416 are utilized to provide DMA capability to both memory interface 404 and processor interface 406. Slave write buffer 418 and slave read buffer 420 are employed to provide buffers for slave read and write functions between the cable and the processor in the peripheral device in accordance with a preferred embodiment of the present invention.

Cable internal logic 408, memory internal logic 410, and processor internal logic 412 include internal arbitration, address decoding, and multiplexing of internal buses well known by those skilled in the art. Memory DMA buffer 414 and processor DMA buffer 416 include data storage for buffer transfers in both directions and control logic utilized to transfer data in and out of the buffers. Furthermore, processor DMA buffer 416 and slave write buffer 418 may track the amount of data transferred. Memory DMA buffer 414 and processor DMA buffer 416 are industry standard buffers well known to those skilled in the art in accordance with a preferred embodiment of the present invention.

Slave write buffer 418 stores data sent from the SBIM along with an associated address. This buffer is utilized when the SBIM is the master on the cable in accordance with a preferred embodiment of the present invention. Slave write buffer 418 then places the data on the processor bus to be sent to the processor in the peripheral device. Slave read buffer 420 is utilized to transfer data from the processor bus to the cable bus when the SBIM is the master in the data transfer. The processor bus is connected processor interface 406 and the cable bus is connected to cable interface 402. By utilizing buffers, DIM 400 may transfer data asynchronously from the cable to the processor or memory bus. All of the blocks within DIM 400 may be assembled utilizing parts well known to those skilled in the art.

Figure 5:
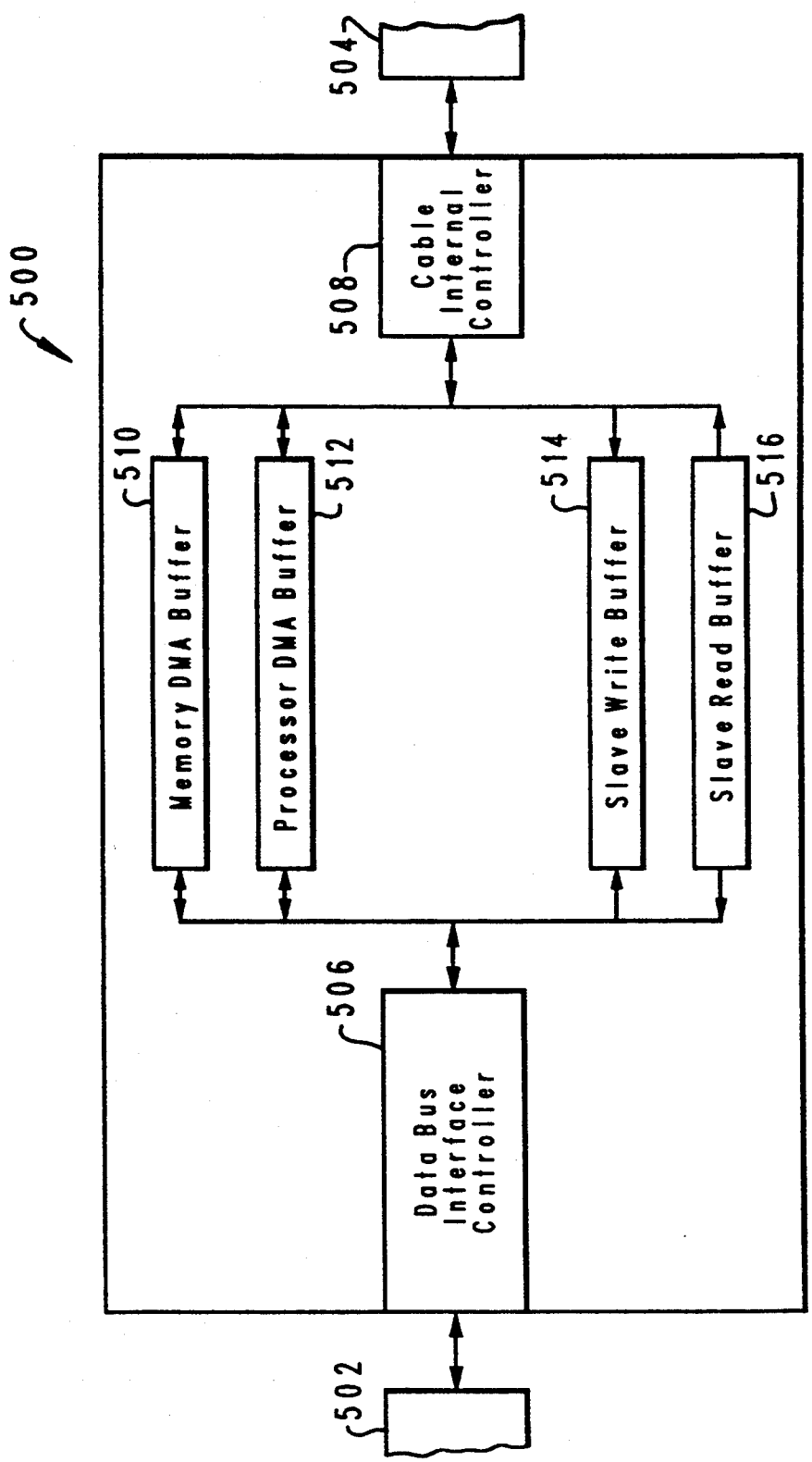
FIG. 5 depicts a block diagram of a system bus interface module (SBIM) in accordance with a preferred embodiment of the present invention.

Referring now to FIG. 5, there is depicted a block diagram of a system bus interface module 500 in accordance with a preferred embodiment of the present invention. SBIM 500 is utilized to provide a connection between system bus 502 and a cable 504. System bus interface controller 506 is utilized to control the communication between SBIM 500 and system bus 502. In accordance with a preferred embodiment of the present invention, system bus 502 is a Micro Channel architecture bus found in PS/2 personal computers and RISC System/6000 work stations from International Business Machines Corporation. Memory DMA buffer 510 and processor DMA buffer 512 are utilized in DMA transfers from cable 504 to system bus 502. Data is transferred from memory DMA buffer 414 and processor DMA buffer 416 across cable 504 to memory DMA buffer 510 and processor DMA buffer 512 for transfer to the system bus 502. Slave write buffer 514 and slave read buffer 516 are utilized in conjunction with slave write buffer 418 and slave read buffer 420, as shown in FIG. 4, during slave read and slave write functions. As with the DIM, SBIM 500 may be implemented utilizing components well known to those skilled in the art.

In accordance with a preferred embodiment of the present invention, memory interface 404 and processor interface 406, as illustrated in FIG. 4 may provide communications to a system bus without knowledge of cable interface 402. The cable transfer protocol implemented should be compatible with the protocol for the system bus utilized to maintain high speed data transfers and to be able to handle exceptions that may occur on the system bus. Additionally, asynchronous communication may be enabled utilizing asynchronous interfaces at the interface between the system bus and the SBIM, the interface between the SBIM and the DIM, and the interface between the DIM and the peripheral device processor. These interfaces may be synchronized by double latching utilized at the system bus interface and at each end of the cable. Double latching means to take an input signal and to latch it and then take the output signal of the latch and latch it again.

The cable signals utilized in accordance with a preferred embodiment of the present invention resemble those on a microprocessor that allow the DIM to communicate with the SBIM in a manner similar to how a microprocessor talks to a slave device.

A minus sign ("−") in front of a signal name indicates that the signal is active when it is at a low-voltage level. When no minus sign ("−") appears, the signal is active when it is at a high-voltage level. For example, −RDY specifies the signal is active low. Also, R/−W is in the R state when it is at a high level and is in the −W state when it is at a low level. The following are definitions of cable signals utilized to extend a system bus employing a Micro Channel architecture in accordance with a preferred embodiment of the present invention.

The following are definitions of signals utilized in bus master mode in accordance with a preferred embodiment of the present invention.

Bus Request ("−BREQ") is a signal driven active by the SBIM as an indication to the DIM that a Micro Channel access to the adapter is pending. This signal may be directly taken from −CD SFDBK Micro Channel signal driven by the SBIM. The DIM then has 7.8 micro seconds to complete the pending Micro Channel cycle. More information on the Micro Channel and various signals may be found in Hardware Technical Reference Micro Channel Architecture for the Risc System/6000 Power Station and Power Server, IBM Publication No. SA23-2647-00.

Bus Grant ("−BGNT") is a signal driven active by the DIM in response to −BREQ. When active, the DIM releases the cable to the SBIM until −BREQ is driven inactive.

Request ("−REQ") is a signal driven active by the DIM requesting the SBIM to perform a first party DMA write or read on the Micro Channel. Address and qualifying signals are valid on the leading edge of this signal.

Ready ("−RDY") is a signal driven active by the SBIM in response to −REQ. When active, the SBIM is indicating that data transfers between adapter and host memory are ready to begin.

Strobe ("−STRB") is a signal driven by the SBIM during master and slave mode and is used to pace the data for 64-bit streaming.

Read/−Write ("R/−W") is a signal driven by the current bus owner and indicates direction of data transfer in relation to the current bus owner.

Data Bits 31 through 0 ("D(31−0)") are lines that make up the data bus. The data bus, which is the interface between the SBIM or the DIM and the cable, is driven by either master or slave depending which is transferring data. D0 is the least significant bit and D31 is the most significant bit.

Address Bits 31 through 0 (A(31−0)") are lines that make up the address bus. The address bus is driven by current bus owner. A0 is the least significant bit and A31 is the most significant bit. The address bus transfers the byte address for all accesses except 64-bit streaming accesses. For streaming accesses, it transfers the address for the first access in the sequence. Then, it is a data bus.

Channel 1 DMA Transfer Count Zero ("CH1_DMA_TC_0") is a signal driven by the SBIM and indicates when the Channel 1 DMA transfer count in the SBIM has gone to zero. This signal is a pulsed signal.

Channel 2 DMA Transfer Count Zero ("CH2$_{13}$ DMA_TC_0") is a signal driven by the SBIM and indicates when the Channel 2 DMA transfer count in the SBIM becomes zero. This signal is a pulsed signal.

Interrupt ("−INT") is a signal driven from the DIM in both master and slave mode and indicates an interrupt request was generated by the adapter to the Micro Channel. This signal is redriven onto the Micro Channel to a interrupt level defined in the SBIM POS registers. See Hardware Technical Reference Micro Channel Architecture for the Risc System/6000 Power Station and Power Server, IBM Publication No. SA23-2647-00 for more information on POS registers.

Reset ("−RESET") is a signal driven by the SBIM and is simply −CHRESET from the Micro Channel redriven onto the cable. −CHRESET is a reset signal from the Micro Channel. This signal is generated by the RISC System/6000 system logic to reset or initialize all adapters at power-on or when a low voltage condition is detected. The system can also activate this signal under program control.

Channel Check ("−CHCHK") is a signal driven by the SBIM and is active when channel check occurs on the Micro Channel and the SBIM is master or slave on the Micro Channel.

Power On ("POWERON") is a signal utilized to indicate to the external adapter that the RISC System/6000 has power and therefore is driven by an R-C circuit on the Micro Channel card. The power supply on the external adapter must use this signal and with the adapter power switch in the on position to qualify power to the adapter.

Adapter On ("ADAP_ON") is a signal utilized to indicate to the SBIM that the external adapter has power and is available for access by the RISC System/6000. The SBIM will store this signal in a register which can be read by the RISC System/6000 during initialization. The following are definitions of signals utilized in a bus slave mode in accordance with a preferred embodiment of the present invention.

Command ("−CMD") is a signal multiplexed with −RDY from bus master mode and is driven by the SBIM. −CMD defines when data on the bus is valid. The trailing edge of this signal indicates the end of the bus cycle.

Suspend ("−SUSPEND") is a signal multiplexed with −REQ from bus master mode and is driven by the DIM. −SUSPEND signifies the slave suspension of data streaming. When the SBIM detects this signal, −STRB is held until −SUSPEND is deactivated. If the SBIM slave write buffers fill or slave read buffers empty during −SUSPEND then the SBIM drives −SDR(1,0) high on the Micro Channel and the streaming cycle is ended. −SDR(1,0) is a status signal on the Micro Channel and more information on −SDR(1,0) may be found in Hardware Technical Reference Micro Channel Architecture for the Risc System/6000 Power Station and Power Server, IBM Publication No. SA23-2647-00.

Busy ("−BUSY") is a signal driven by the DIM. −BUSY tells the SBIM to initiate the transfer on the cable but not to release the Channel ready signal ("CD CHRDY") on the Micro Channel until this signal is inactive.

Transfer 64/−32 ("XFER64_32") is a signal driven by the SBIM. When this signal is high the slave transfer is 64 bits. When this signal is low, the slave transfer is 32 bits. This signal may change during −CMD.

ROM Access ("−ROM") is a signal driven by the SBIM that is utilized to indicate to the DIM that the current SBIM slave access to the cable is to ROM and not the DIM. This signal allows access to the cable without accessing the DIM.

Although 64-bit streaming is utilized in accordance with a preferred embodiment of the present invention, other bit sizes also may be utilized.

The following is the arbitration procedure followed to assert command or control of the system bus in accordance with a preferred embodiment of the present invention:

1. SBIM asserts −BREQ;
2. DIM must suspend a DMA cycle or complete a register access to SBIM since once −BREQ is active, the Micro Channel will not allow any other cycles to occur;
3. DIM returns −BGNT, relinquishing control of the bus to the SBIM;
4. The following lines change: REQ becomes −SUSPEND, RDY becomes −CMD, and R/−W, A(31−0) go into tristate for 200 ns and then are driven by the SBIM;
5. SBIM continues to hold CD CHRDY on the Micro Channel not ready until the slave write buffers have room or the slave read buffers contain data;
6. Data transfer occurs (−CMD is lifted);
7. −BREQ remains valid for additional 200 ns. This signal allows sequential accesses to the adapter for store multiple without arbitrating for each access;
8. −BREQ is lifted and then −BGNT is lifted; and
9. The following lines change back: −SUSPEND becomes −REQ, −CMD becomes −RDY, and R/−W, A(31−0) go into tristate for 200 ns and then are driven by the DIM.

The data transfer procedures are utilized to transfer data between a current bus owner and a slave. The four types of data transfer procedures include: (1) DIM master basic transfer; (2) DIM master streaming data transfer; (3) SBIM master basic transfer; and (4) SBIM master streaming data transfer.

DIM master transfers correspond to Micro Channel master transfers. SBIM master transfers correspond to Micro Channel slave transfers. For Micro Channel slave transfers, the SBIM uses the slave write and read buffers to interface between the Micro Channel and cable. Therefore, these data transfers use a slightly different protocol than the master transfers.

Each procedure defines the signal sequences and the signal timing specifications used in the procedure. A "cycle" is one or more data transfers. DIM clock and SBIM clock are input signals into the DIM and SBIM to drive the chips. The following describes each procedure, the signal sequence for each procedure, and the signal timing specifications.

DIM Master Basic Transfer involves the following steps:

1. DIM drives D(31−0) for writes, A(31−0) and R/−W valid beginning the cycle;

2. One DIM clock later, −REQ is asserted. A(31−0) is not latched and will remain valid until −RDY is returned;
3. SBIM requests Micro Channel and initiates Micro Channel transfer;
4. SBIM asserts −RDY to signify cycle completion;
5. DIM removes −REQ; and
6. SBIM removes −RDY and the cycle is complete.

DIM Master Streaming Data Transfer includes the following steps:

1. DIM drives D(31−0) for writes, A(31−0) and R/−W valid beginning the cycle;
2. One DIM clock later, −REQ is asserted. A(31−0) is not latched and will remain valid until −RDY is returned;
3. SBIM requests Micro Channel and initiates Micro Channel transfer;
4. SBIM asserts −RDY to signify beginning of streaming;
5. The SBIM indicates the ability to perform streaming data transfers by activating −STRB, which is utilized by both the SBIM and the DIM to transfer data by clocking on and off the address bus and the data bus on the falling edge of −STRB, Where each falling edge of −STRB corresponds with its 64-bit data transfer (the operation proceeds with the new data being placed on the address bus and the data bus each time −STRB makes a high-to-low transition);
6. Both the address bus and data bus are used for transferring data for the remainder of the cycle;
7. DIM removes −REQ;
8. SBIM removes −RDY and the cycle is complete; and
9. Data is held valid until the end of −RDY.

Note: For Micro Channel writes, steps 3 and 5 are reversed to allow the SBIM to fill its intermediate buffers. −STRB is then suspended until such time when the Micro Channel side of the intermediate buffer starts to drain.

SBIM Master Basic Transfer involves the following procedures:

1. SBIM drives D(31−0) for writes, A(31−0) and R/−W valid beginning the cycle;
2. One SBIM clock later, −CMD is asserted. A(31−0) is not latched and will remain valid 100 ns after −CMD is asserted;
3. If −BUSY has been driven active, the cycle is extended until −BUSY is driven inactive; and
4. −CMD goes inactive and the cycle is complete.

SBIM Master Streaming Data Transfer includes the following procedures:

1. SBIM drives D(31−0) for writes, A(31−0) and R/−W valid beginning the cycle;
2. One SBIM clock later, −CMD is asserted. A(31−0) is not latched and will remain valid 100 ns after −CMD is asserted;
3. If −BUSY has been driven active, the cycle is extended until −BUSY is driven inactive;
4. The SBIM indicates the ability to perform streaming data transfers by activating −STRB. −STRB is utilized by both the SBIM and the DIM to transfer data by clocking data on and off the address bus and the data bus on the falling edge of −STRB, where each falling edge of −STRB corresponds with its 64-bit data transfer (the operation proceeds with the new data being placed on the address bus and the data bus each time −STRB makes a high-to-low transition);
5. Both the address bus and the data bus are utilized for transferring data for the remainder of the cycle; and
6. −CMD goes inactive and the cycle is complete.

Exception conditions may also exist in the system bus being extended to the external peripheral device. As a result, the exception should also be accounted for in accordance with a preferred embodiment of the present invention. The exception conditions in the description that follows are events that interrupt normal data flow and require a response within a specified amount of time in order to adhere to Micro Channel architecture guidelines. Exception conditions that require reporting to the controlling or system master are listed in the Micro Channel architecture specifications and may be supported solely by the SBIM. Micro Channel exception conditions are not supported by the cable architecture in accordance with a preferred embodiment of the present invention.

The following are three types of exception conditions are supported by the cable architecture: (1) Micro Channel Slave termination when DIM is cable bus master; (2) Micro Channel Slave termination when DIM is cable bus slave; and (3) Channel Check.

A slave may terminate streaming transfers on the Micro Channel at any time by driving −SDR(0,1) inactive. The controlling master must then drive −CMD inactive at the point where the next −SD STROBE would have been. The way slave termination is indicated on the cable is −RDY going invalid before −REQ during a streaming transfer. For transfers to the DIM, all data in the SBIM intermediate buffers are sent to the DIM before raising −RDY. For transfers from the DIM, the SBIM fills the intermediate buffers before raising −RDY. The SBIM then reaccesses the slave device and the transfers are resumed.

As described previously, the slave can terminate streaming transfers on the Micro Channel at any time. If suspension of an ongoing streaming data transfer is required by the external adapter, the DIM drives −SUSPEND active to the SBIM. However, the DIM must still respond to subsequent −STRBs from the SBIM until −CMD is lifted and the cycle is over.

In certain situations, it may be necessary to drive a channel check on the Micro Channel. This signal is redriven to the DIM to allow the DIM DMA state machines to recognize what state channel check occurred in and pass this information to the processor via an interrupt on the local bus.

Figure 6B:
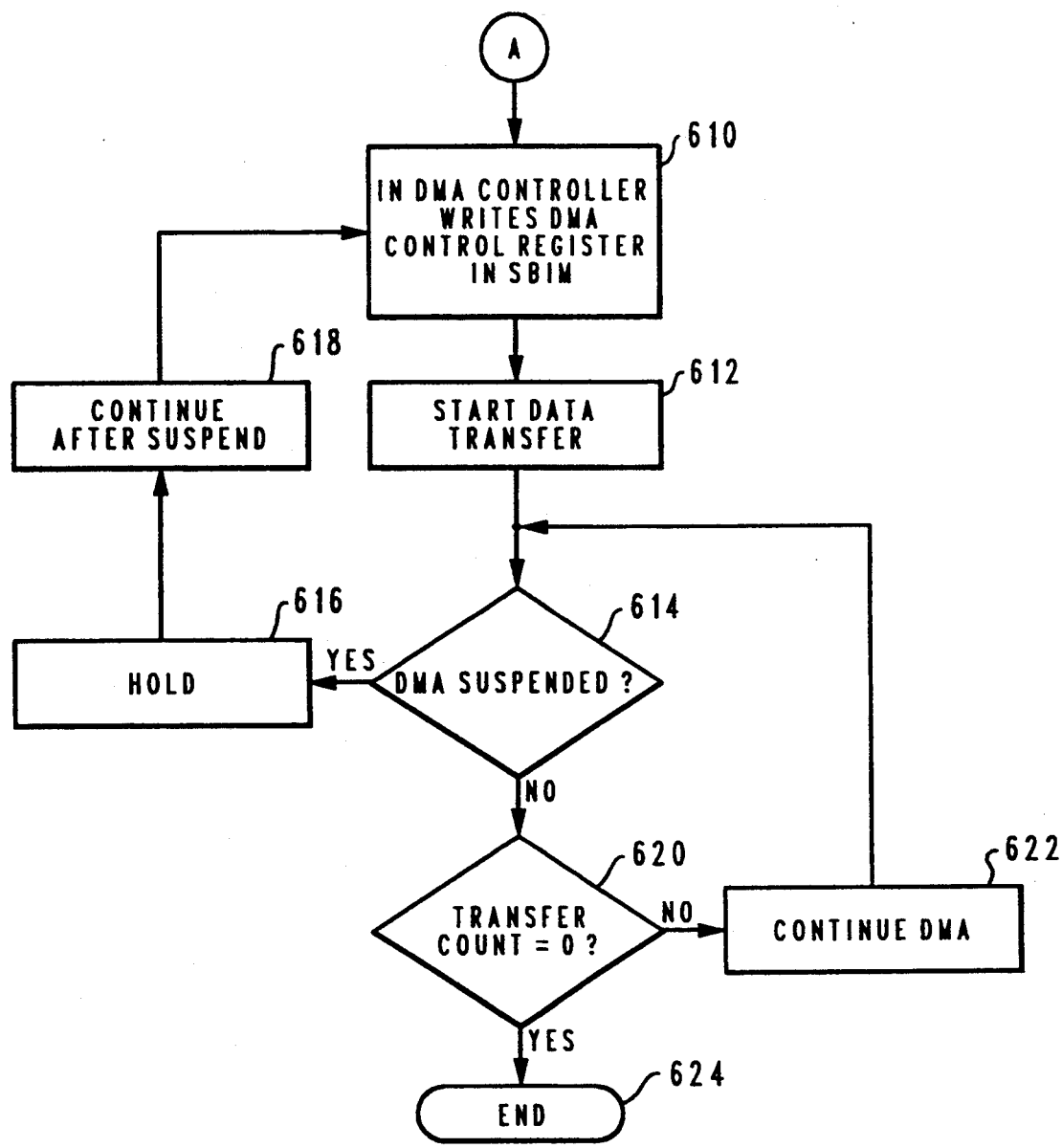
FIG. 6B is a portion of a logical flowchart for a method and system of DMA transfer in accordance with a preferred embodiment of the present invention.

With reference to FIG. 6A and FIG. 6B, there is depicted a high level flowchart for a method and system of DMA transfer in accordance with a preferred embodiment of the present invention. As illustrated, the process begins in block 600 and thereafter proceeds to block 602, which depicts the processor in the peripheral device writing a local start address to the DIM. Next, the process proceeds to block 604, which illustrates the processor writing the system bus start address to the SBIM. Afterward, the process proceeds to block 606, which depicts the processor writing the DMA length count to the DMA controllers in both the SBIM and the DIM simultaneously. The length count indicates how much data is going to be transferred. The process then proceeds to block 608, which illustrates the processor writing to the DMA control register in the DIM. The control register includes information such as what type of DMA transfer is occurring and special flags that are set in most DMA controllers. Block 602 through 608 are often utilized for programming DMAs in the processor utilizing methods well known by those skilled in the art. Thereafter, the process proceeds to block 610 in FIG. 6B via connector A.

In block 610, the DIM DMA controller writes to the control register in the SBIM. Afterward, the process proceeds to block 612, which depicts staring the data transfer. Thereafter, the process proceeds to block 614, which illustrates a determination of whether or not the DMA has been suspended. If the DMA has been suspended, the process proceeds to block 616, which depicts a hold in transferring data. Afterward, the process proceeds to block 618, which illustrates continuing to transfer data after the suspend. The process then returns to block 610.

Referring back to block 614, if the DMA is not suspended the process then proceeds to block 620, which depicts a determination of whether or not the transfer count is equal to zero. The transfer count equals zero when all the data has been transferred. If the transfer count is not equal to zero, the process then proceeds to block 622, which illustrates the continuing of DMA data transfer. Afterward, the process returns to block 614.

Referring back to block 620, if the transfer count is equal to zero, the process terminates as depicted in block 624.

Figure 7A:
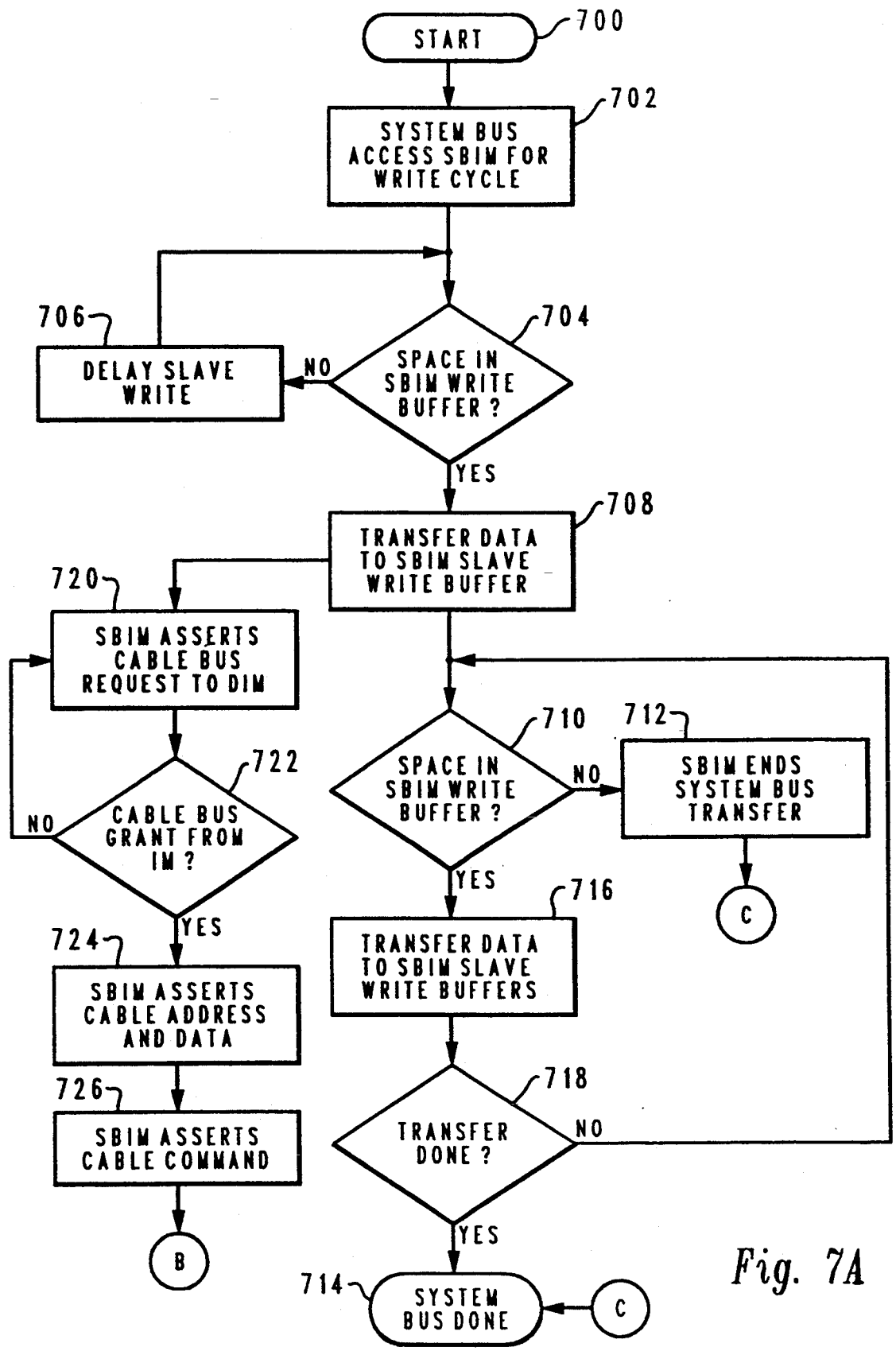
FIG. 7A depicts a portion of a logical flowchart of a method and system for a slave write to the peripheral device in accordance with a preferred embodiment of the present invention.
Figure 7B:
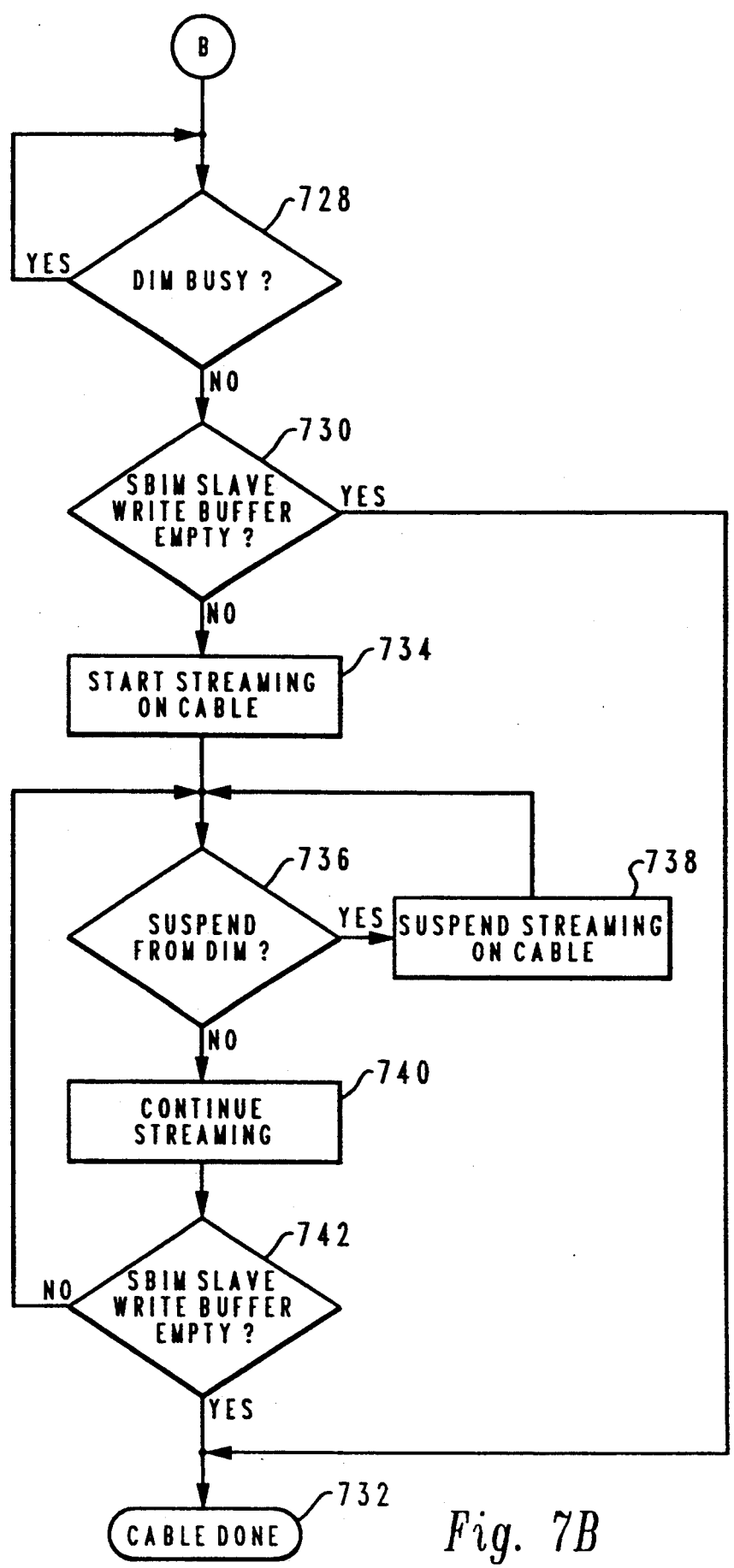
FIG. 7B depicts a portion of a logical flowchart of a method and system for a slave write to the peripheral device in accordance with a preferred embodiment of the present invention.

Referring now to FIG. 7A and to FIG. 7B, there is depicted a high level flowchart of a method and system for a slave write to the peripheral device in accordance with a preferred embodiment of the present invention. The process begins as illustrated in block 700 and thereafter proceeds to block 702, which depicts the system bus accessing the SBIM for a write cycle. Afterward, the process proceeds to block 704, which illustrates a determination of whether or not space exists in the SBIM write buffer. If space does not exist in the SBIM write buffer, the process then proceeds to block 706, which depicts the delaying of the slave write. The process then returns to block 704.

Referring back to block 704, if space exists in the SBIM write buffer, the process then proceeds to block 708 which illustrates the transfer of data to the SBIM slave write buffer from the system bus. The process then proceeds to block 710, which depicts a determination of whether or not space is available in the SBIM write buffer. If space is not available in the SBIM write buffer, the process proceeds to block 712, which illustrates the SBIM ending the system bus transfer of data. Afterward, the process proceeds to block 714 via connector C, which illustrates the finishing or termination of the portion of the process involving the transfer data to the SBIM from the system bus.

Referring back to block 710, if space in the SBIM write buffer is available, the process then proceeds to block 716, which depicts the transfer of data to the SBIM slave write buffers. Afterward, the process proceeds to block 718, which depicts a determination of whether or not the transfer of data is done. If the transfer of data is not done, the process returns to block 710. Referring back to block 718, if the transfer of data is done the process proceeds to block 714, which illustrates the finishing or termination of the system bus portion of the process.

Referring back to block 708, the process also proceeds to block 720, which illustrates the SBIM asserting a cable bus request to the DIM. Thereafter, the process proceeds to block 722, which depicts a determination of whether or not a cable bus grant from the DIM has occurred. If a cable bus grant has not occurred, the process returns to block 720.

Referring back to block 722, if a cable bus grant from the DIM has occurred, the process then proceeds to block 724, which illustrates the SBIM asserting cable address and data. The process then proceeds to block 726, which depicts the SBIM asserting a cable command. Thereafter, the process proceeds to block 728 in FIG. 7B via connector B. Block 728 illustrates a determination of whether or not the DIM is busy. If the DIM is busy, the process returns to block 728 and continues in this loop until the DIM becomes free. If the DIM is not busy, the process then proceeds to block 730, which depicts a determination of whether or not the SBIM slave write buffer is empty. If the SBIM slave write buffer is empty, the process proceeds to block 732, which illustrates the finishing or termination of the cable portion of the process.

Referring back to block 730, if the SBIM slave write buffer is not empty, the process then proceeds to block 734, which depicts the starting of streaming on the cable. "Streaming" means that the data is being strobed by the method and system of the present invention. Next, the process proceeds to block 736, which illustrates a determination of whether or not a suspend signal has been received from the DIM. If a suspend signal has been received from the DIM, the process then proceeds to block 738, which depicts the suspending of streaming on the cable. Thereafter, the process returns to block 736.

Referring back to block 736, if a suspend signal has not been received from the DIM, the process proceeds to block 740, which illustrates continuing streaming on the cable. Thereafter, the process proceeds to block 742, which depicts a determination of whether or not the SBIM slave write buffer is empty. If the SBIM slave write buffer is not empty, the process returns to block 736.

Referring back to block 742, if the SBIM slave write buffer is empty, the process proceeds to block 732, which illustrates the finishing or termination of the cable portion of the process.

Figure 8B:
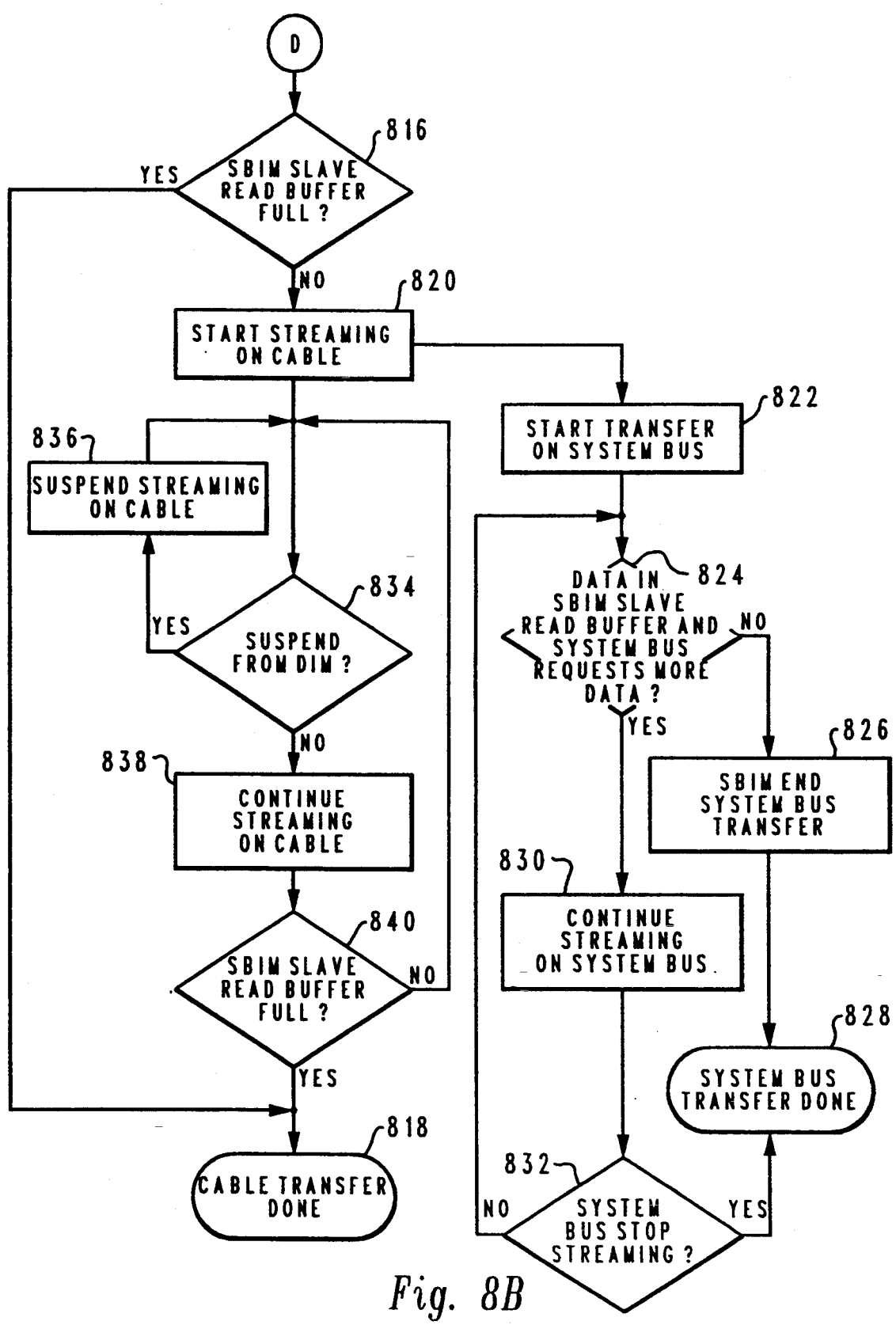
FIG. 8B is a portion of a logical flowchart for a method and system for performing a slave read in accordance with a preferred embodiment of the present invention.

With reference now to FIG. 8A and to FIG. 8B, there is depicted a high level flowchart of a method and system for performing a slave read in accordance with a preferred embodiment of the present invention. The process begins as illustrated in block 800 and thereafter proceeds to block 802, which depicts a system bus accessing the SBIM for a read cycle. Afterward, the process proceeds to block 804, which illustrates the SBIM asserting a cable bus request to the DIM. The process then proceeds to block 806, which depicts a determination of whether or not a cable bus grant has been received from the DIM. If a cable bus grant has not been received from the DIM, the process returns to block 804.

Referring back to block 806, if a cable bus grant has been received from the DIM, the process proceeds to block 808, which illustrates the SBIM asserting a cable address. The process then proceeds to block 810, which depicts the SBIM asserting a cable command. Thereafter, the process proceeds to block 812, which illustrates a determination of whether or not the DIM is busy. If the DIM is busy, the process returns to block 812 and continues in this loop until the DIM is free. Referring back to block 812, if the DIM is free, the process proceeds to block 814, which depicts storing data to the SBIM slave read buffer.

The process then proceeds to block 816 in FIG. 8B via connector D. Block 816 depicts a determination of whether or not the SBIM slave read buffer is full. If the SBIM read slave buffer is full, the process terminates cable transfer as illustrated in block 818.

Referring back to block 816, if the SBIM slave read buffer is not full, the process proceeds to block 820, which depicts the starting of streaming on the cable. Thereafter, the process proceeds to block 822, which illustrates starting the transfer of data on the system bus. Afterward, the proceeds to block 824, which depicts a determination of whether or not data is present in the SBIM slave read buffer and whether or not the system bus requests more data. If data is not present in the SBIM slave read buffer or if the system bus does not request more data, the process proceeds to block 826, which illustrates the SBIM ending the system bus transfer. Thereafter, the system bus transfer portion of the process is finished as illustrated in block 828.

Referring back to block 824, if data is present in the SBIM slave read buffer and the system bus requests more data, the process continues to block 830, which depicts the continuation of streaming of data on the system bus. Next, the process proceeds to block 832, which illustrates a determination of whether or not the system bus has stopped streaming data. If the system bus has not stopped streaming data, the process returns to block 824. Referring back to block 832, if the system bus has stopped streaming data the process proceeds to block 828, which illustrates the finishing or termination of the system bus transfer process.

Referring back to block 820, the process also proceeds to block 834 at the same time as the process proceeds to block 822. Block 834 depicts a determination of whether or not a suspend signal has been received from the DIM. If a suspend signal has been received from the DIM, the process proceeds to block 836, which illustrates suspending streaming on the cable. Thereafter, the process returns to block 834.

Referring back to block 834, if a suspend signal has not been received from the DIM, the process proceeds to block 838, which depicts the continuation of streaming on the cable. The process next proceeds to block 840, which illustrates a determination of whether or not the SBIM slave read buffer is full. If the SBIM read slave buffer is not full, the process returns to block 834.

Referring back to block 840, if the SBIM slave read buffer is full, the process proceeds to block 818, which illustrates the finishing or termination of cable transfer portion of the process.

Specific address space is reserved for one word slave reads in accordance with a preferred embodiment of the present invention. The system bus recognizes this address space and will not stream data across the cable in this address space in accordance with a preferred embodiment of the present invention. As a result, a means around the slave read or prefetch buffer for address spaces where streaming is not allowed, i.e., a register space is provided.

Figure 9:
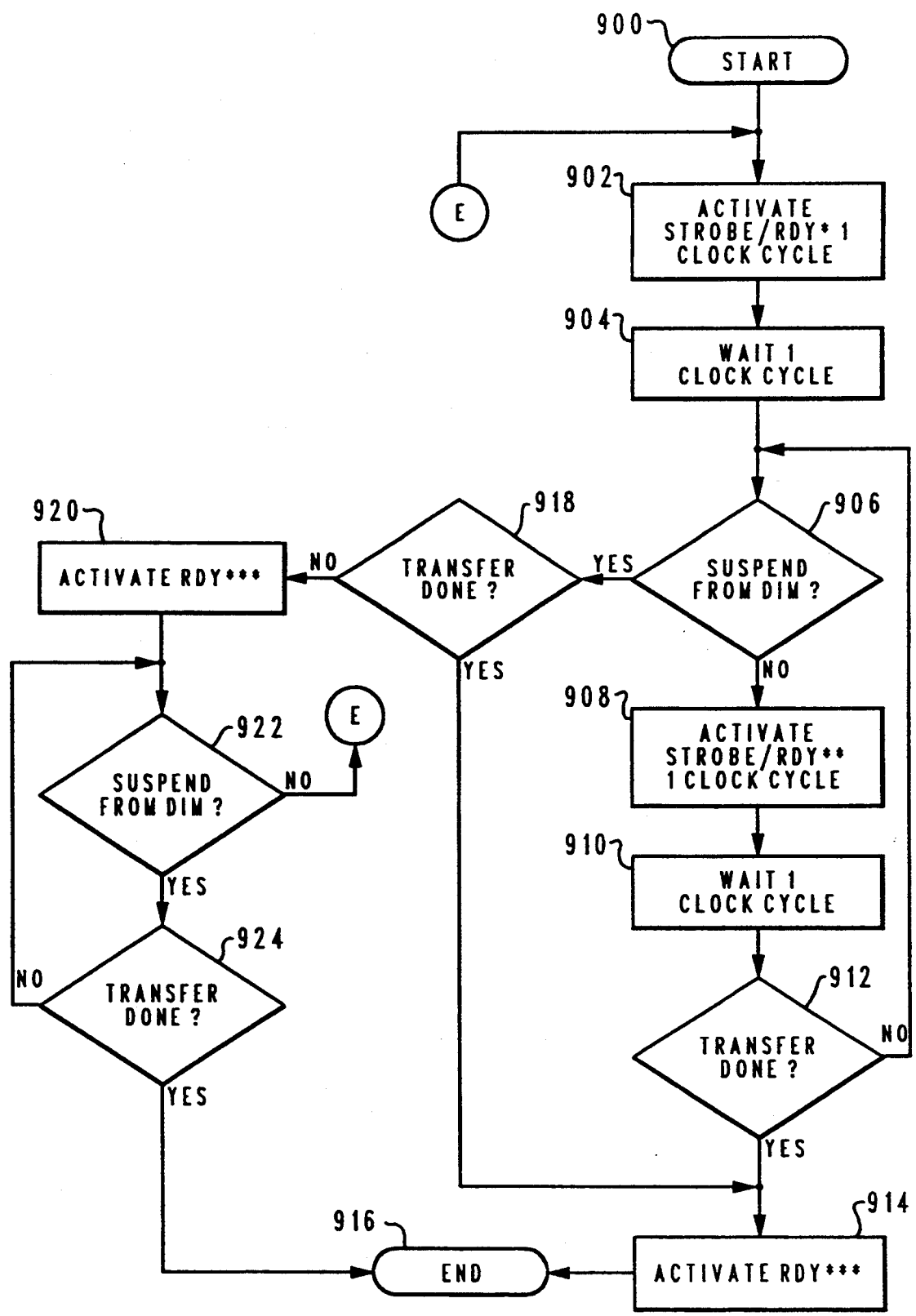
FIG. 9 depicts a logical flowchart of a method and system for data pacing/ready signal generation in the SBIM in accordance with a preferred embodiment of the present invention.

Referring now to FIG. 9, there is depicted a high level flowchart of a method and system for data pacing-/ready generation in the SBIM in accordance with a preferred embodiment of the present invention. "RDY*" means to generate an RDY signal on slave writes or DMA reads only. "RDY" means generating an RDY signal for any type of transfer. "RDY*" means generate a RDY signal for slave reads or DMA writes only.

As illustrated, the process begins in block 900 and thereafter proceeds to block 902, which depicts activating strobe/RDY* for one clock cycle. Thereafter, the process proceeds to block 904, which illustrates waiting for one clock cycle. The process then proceeds to block 906, which depicts a determination of whether or not a suspend signal has been received from the DIM. If a suspend signal has not been received from the DIM, the process proceeds to block 908, which illustrates the activation of strobe/RDY** for one clock cycle. Thereafter, the process proceeds to block 910, which depicts waiting for one clock cycle. Then, the process proceeds to block 912, which illustrates a determination of whether or not the transfer is done. If the transfer is not done, the process returns to block 906.

Referring back to block 912, if the transfer is done, the process proceeds to block 914, which depicts activating RDY***. Thereafter, the process terminates as illustrated in block 916.

Referring back to block 906, if a suspend signal from a DIM has been received, the process proceeds to block 918, which depicts a determination of whether or not the transfer is done. If the transfer is done, the process proceeds to block 914, which depicts the activating of RDY*** with the process terminating thereafter as illustrated in block 916.

Referring back to block 918, if the transfer is not done, the process proceeds to block 920, which illustrates the activating of RDY***. Afterward, the process proceeds to block 922, which depicts a determination of whether or not a suspend signal is present from the DIM. If a suspend signal is not present, the process returns to block 902 via connector E.

Referring back to block 922, if a suspend signal is present, the process proceeds to block 924, which illustrates a determination of whether or not the transfer is done. If the transfer is not done, the process returns to block 922. Referring again to block 924, if the transfer is done, the process terminates as illustrated in block 916.

A strobe signal is generated from the SBIM to the DIM when data is traveling in both directions. The delay of the strobe traveling to the DIM and the delay of data traveling to the SBIM must be accounted for when data is traveling in the opposite direction of the strobe signal. In accordance with a preferred embodiment of the present invention, the delay includes the DIM/SBIM input and output buffers and the travel time over a cable of length M. In order to ensure sufficient time for the data to be valid at the SBIM, data is clocked off the system bus on the falling edge of the next consecutive strobe. If a strobe is not generated due to the transfer being ended or suspended, then the data is clocked off the system bus at the time it would have been generated.

The SBIM is utilized for data pacing on the cable. As a result, the DIM samples the data pacing signal when sending receiving data from the SBIM in accordance with a preferred embodiment of the present invention. Additionally, in order to sample the strobe signal adequately, the DIM clock should be faster than the frequency of the strobe signal.

Figure 10:
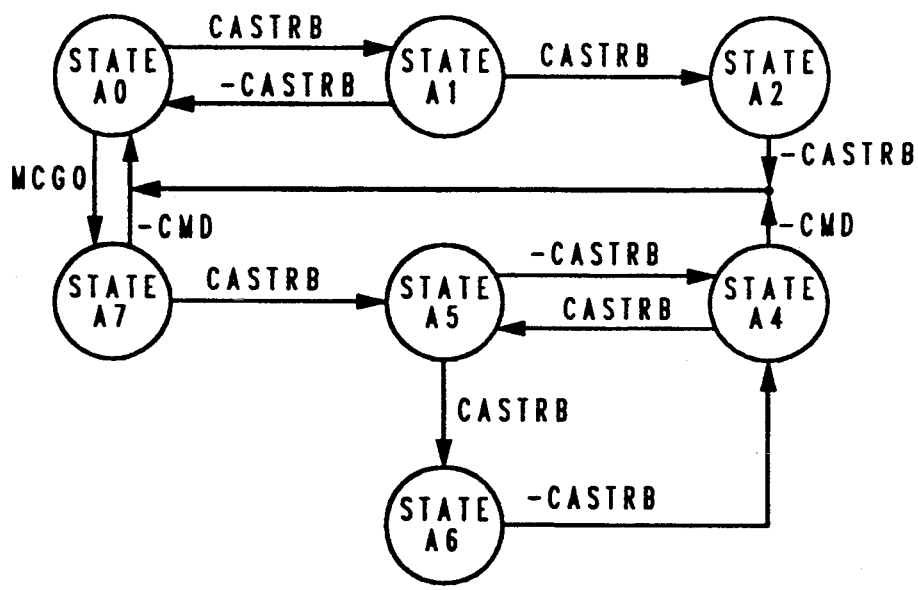
FIG. 10 is a state machine for cable strobe/ready signal generation in accordance with a preferred embodiment of the present invention.

Referring now to FIG. 10, there is depicted a state machine for cable strobe/ready signals in accordance with a preferred embodiment of the present invention. This state machine allows only one ready or RDY per strobe to the DMA controller and only one ready per strobe to the DIM's slave read and write buffers. A cable strobe signal, CASTRB, results in the state machine proceeding to State A1, which causes a strobe for DMA transfer and issues a ready to the DMA controller. Another CASTRB signal results in the state machine shifting to State A2, which is an extended strobe state for the DMA controller. A −CASTRB signal results in the state machine returning to State A0. A MCGO signal results in the state machine shifting to State A7, which is the initial state for slave access to the DIM. A MCGO signal means that a grant, allowing the SBIM to be the master on the cable, has been received from the DIM on the cable.

In State A7, a ready is issued only if a command, CMD, signal goes away or if it is the first strobe from State A7. A −CMD results in the state machine shifting back to State A0. The state machine shifts to State A5 in response to a CASTRB signal. State A5 is an extended strobe state for slave access to the DIM. Another CASTRB signal results in the state machine shifting to State A6, which is also an extended strobe state for slave access to the DIM. From State A6, the state machine may shift to State A4 in response to a −CASTRB signal. A −CMD signal results in the state machine returning to state zero. As illustrated, the state machine may shift between State A0 and State A1 and between State A5 and State A4 indefinitely, depending upon the CASTRB signal.

Figure 11:
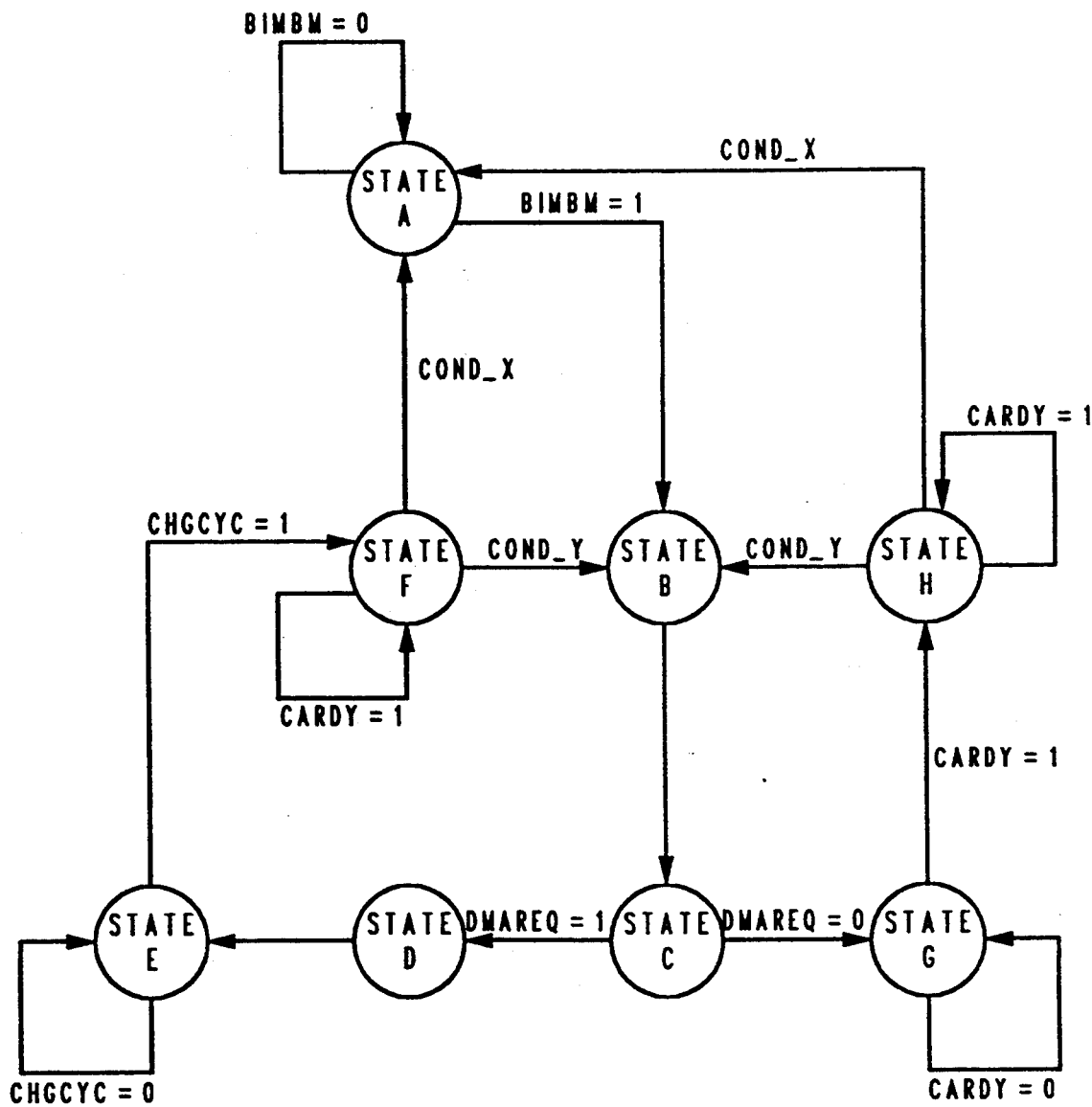
FIG. 11 depicts a DIM master cable transfer state machine in accordance with a preferred embodiment of the present invention.

Referring now to FIG. 11, there is depicted a DIM master cable transfer state machine in accordance with a preferred embodiment of the present invention. The state machine for the DIM master cable transfer generates a request signal and multiplexes between data and address in the beginning of the cycle. CARDY is cable ready from the SBIM, CHGCYC indicates that the arbitration state machine has changed, and BIMBM indicates that a request to the DIM cable exists.

The state machine begins in State A which latches the address. The state machine remains in State A as long as BIMBM equals zero. If BIMBM equals one, the state machine shifts to State B which drives the address and outputs a cable request. Thereafter, the state machine shifts to state C, which also drives the address and outputs a cable request. If DMAREQ equals one, the state machine shifts to State D, which also drives the address and outputs a cable request. At State E, the state machine drives data for writes. The state machine remains in State E as long as CHGCYC equals zero. When CHGCYC equals one, the state machine shifts to State F, which is the end of the output cycle. Upon some condition x, COND-X, the state machine returns to state A and upon condition y, COND-Y, the state machine returns to State B. COND-X is when BIMBM equals zero and CARDY equals zero. COND-Y occurs when BIMBM equals one and CARDY equals zero. The state machine remains in State F as long as CARDY equals one.

From State C, the state machine may shift to State G, which is output REGRDY if DMAREQ equals zero. At State G, the state machine remains at this state as long as CARDY equals zero. When CARDY equals one, the state machine shifts to State H. At this state, the state machine is waiting for CARDY to equal zero. The state machine remains in this state as long as CARDY equals one. Upon COND-X, the state machine shifts back to State A, and upon COND-Y, the state machine shifts to State B.

Figure 12:
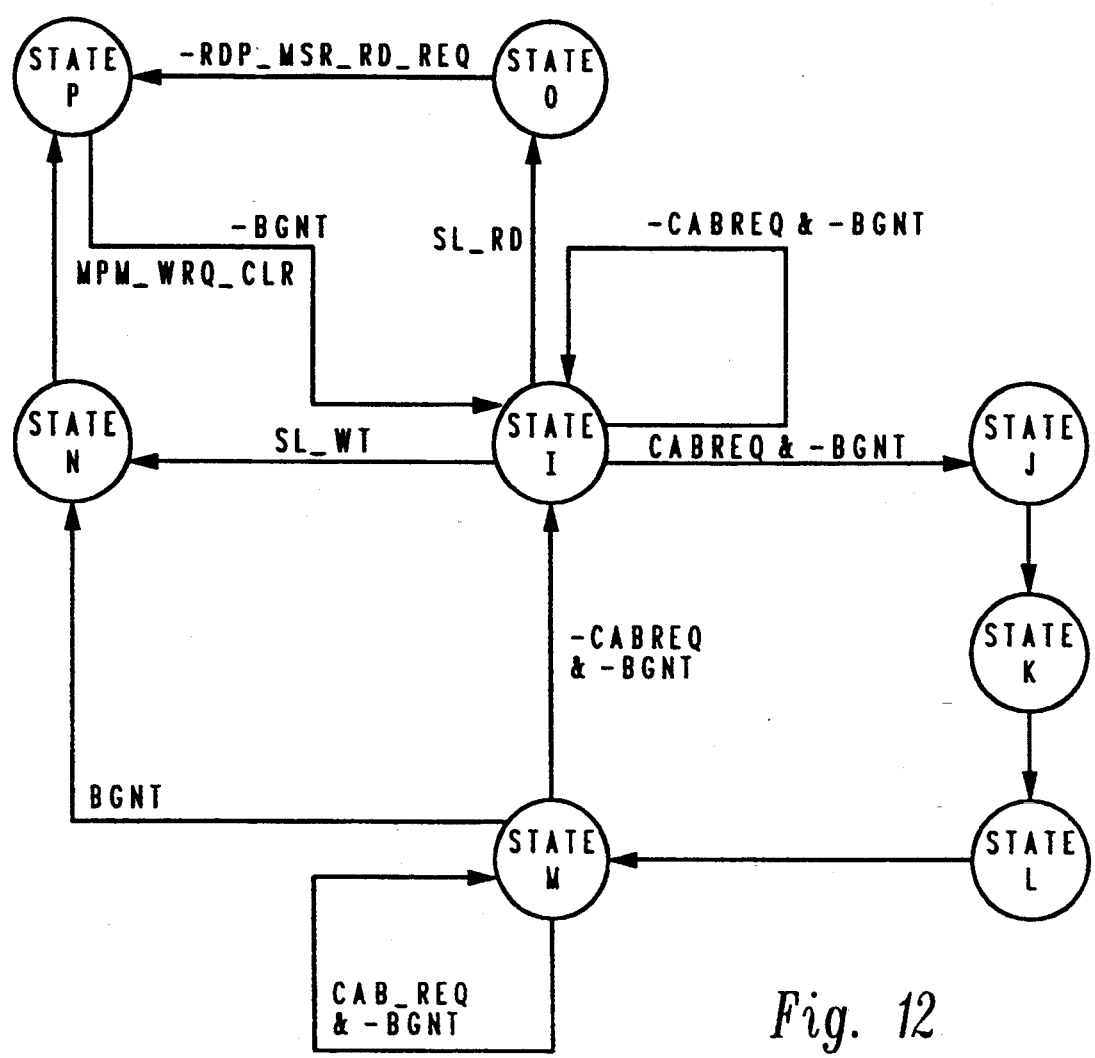
FIG. 12 is a cable interface controller state machine in accordance with a preferred embodiment of the present invention.

With reference now to FIG. 12, there is depicted a cable interface controller state machine in accordance with a preferred embodiment of the present invention. This state machine controls the arbitration for the cable bus and also latches addresses from the cable and data to the cable. CARBREQ is a cable request from the DIM. BGNT is a bus grant from the DIM. RDP_MSR_RD_REQ is a SBIM slave read buffer request to the cable. MPM_WRQ_CLR is a clear signal to the slave write buffers asserted after a slave write buffer is emptied onto the cable. This state machine basically controls the flow for pacing in accordance with a preferred embodiment of the present invention.

As illustrated, the state machine is initially in State I. The state machine remains in State I as long as the condition not CABREQ and −BGNT are present. When CABREQ and −BGNT is present, the state machine shifts to State J to latch an address from the cable. Afterward, the state machine shifts to State K, which outputs select to qualify register access to indicate whether a write or read is occurring. Next, the state machine shifts to State L, which outputs select to qualify register access.

Afterward, the state machine shifts to State M and outputs a cable ready signal. The state machine remains in State M as long as CAB_REQ and −BGNT is present. If −CAB_REQ and −BGNT are present, the state machine returns to State I. If BGNT is present while the state machine is in State M, the state machine then shifts to State N and initiates a slave write substate. In this state, the state machine waits while slave writes occur on the cable.

Next, the state machine shifts to State P and waits for BGNT to go away. When −BGNT is present, the state machine returns to the initial state in State I. In State I, the state machine may shift to State O if a slave read signal ("SL_RD") is present. State O is a slave read substate. From State O, the state machine may shift to state P if −RDP_MSR_RD_REQ is present. The state machine will shift from State I to State M if a slave write signal ("SL_WT") is present.

Although the depicted embodiment involves a Micro Channel architecture bus, other system buses may be utilized which allow peripheral devices and adapters to have bus master and slave capabilities in accordance with a preferred embodiment of the present invention.

Figure 13:
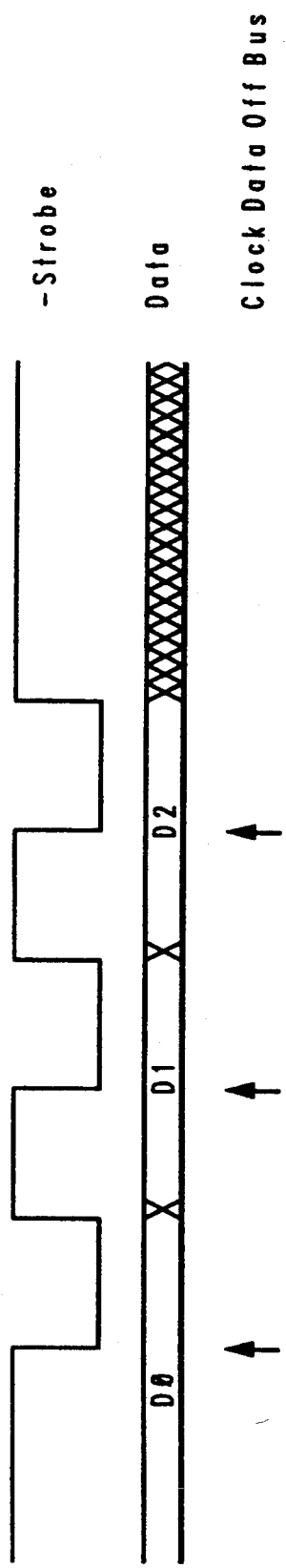
FIG. 13 depicts a timing diagram for transferring data off a bus by a DIM in accordance with a preferred embodiment of the present invention.
Figure 14:
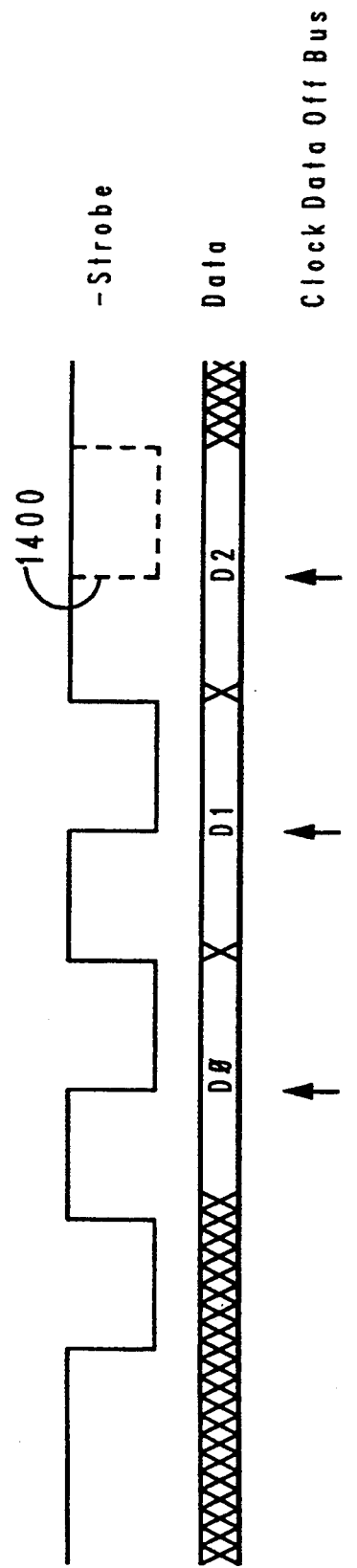
FIG. 14 is a timing diagram showing transfer of data off a bus by a SBIM in accordance with a preferred embodiment of the present invention.

Referring now to FIG. 13 and FIG. 14, signals involved in the transfer of data between the DIM and the SBIM are illustrated in timing diagrams, including a strobe signal. FIG. 13 illustrates the transfer of data from the SBIM to the DIM, while FIG. 14 shows the transfer of date from the DIM to the SBIM. When data is transferred to the DIM, the DIM clocks off the data from the cable. In the situation where data is transferred to the SBIM, data is clocked off the bus by the SBIM.

In accordance with a preferred embodiment of the present invention, a strobe signal is generated from the SBIM to the DIM when data is travelling in both directions. For data travelling in the same direction as the strobe signal, capturing data is simple. For data travelling in the opposite direction of the strobe signal, the delay of the strobe to the DIM and the delay of the data to the SBIM should be taken into account. The delay includes the DIM/SBIM input and output buffers and travel time over the length of the cable connecting the external device to the system bus. To ensure sufficient time for the data to be valid at the SBIM, data is clocked off the system bus on the falling edge of the next consecutive strobe. If a strobe signal is not generated due to the transfer being terminated or suspended, the data is then docked off the bus at the time it would have been generated as shown at point 1400 in FIG. 14.

Additionally since the SBIM is responsible for data pacing on the cable, the DIM must sample the data pacing signal to send or receive data to or from the SBIM. As a result, in order to sample the strobe adequately, the DIM clock should be faster than twice the frequency of the strobe signal.

While the invention has been particularly shown and described with reference to a preferred embodiment, it will be understood by those skilled in the art that various changes in form and detail may be made therein without departing from the spirit and scope of the invention.

What is claimed is:

1. A data processing system having at least one computer system, said at least one computer system including an internal bus and an external device, wherein said internal bus is coupled to said external device via a cable, wherein said external device includes an external processor capable of accessing data within said at least one computer system, said data processing system comprising:

an interface module having a plurality of buffers for storing data, wherein said interface module comprises two submodules, an internal bus interface submodule and an external processor interface submodule, wherein said internal bus interface submodule is coupled to said internal bus and to said cable and wherein said external processor interface submodule is connected to said cable and said external processor interface submodule is coupled to said external device;

control circuitry within said interface module for reading from and placing data into said plurality of buffers; and transmission circuitry within said interface module for timing and controlling transmission of data from said plurality of buffers to said internal bus and said external processor in a manner that emulates direct transfer of data between said internal bus and a processor coupled directly to said internal bus, wherein said interface module includes circuitry for allowing said external processor to control said internal bus, wherein said internal bus interface submodule includes signal circuitry for generating a strobe signal for transmission across said cable to said external processor submodule, wherein said strobe signal provides timing for transmission of signals to said internal bus interface submodule and to said external processor interfaced submodule coupled to said cable.

* * * * *